US009366585B2

(12) United States Patent
Andersson et al.

(10) Patent No.: US 9,366,585 B2
(45) Date of Patent: Jun. 14, 2016

(54) DEVICE FOR MEASURING FORCE COMPONENTS, AND METHOD FOR ITS PRODUCTION

(71) Applicant: ACREO SWEDISH ICT AB, Kista (SE)

(72) Inventors: Gert Andersson, Lindome (SE); Milena Anguelova, Lindome (SE); Nils Hedenstierna, Vastra Frolunda (SE); Alexandra Nafari, Gothenburg (SE); David Westberg, Uppsala (SE)

(73) Assignee: ACREO SWEDISH ICT AB, KISTA (SE)

( * ) Notice: Subject to any disclaimer, the term of this patent is extended or adjusted under 35 U.S.C. 154(b) by 102 days.

(21) Appl. No.: 14/034,740

(22) Filed: Sep. 24, 2013

(65) Prior Publication Data
US 2014/0083210 A1    Mar. 27, 2014

Related U.S. Application Data

(60) Provisional application No. 61/705,238, filed on Sep. 25, 2012.

(30) Foreign Application Priority Data

Sep. 25, 2012 (EP) .................................... 12185908

(51) Int. Cl.
*G01L 1/04* (2006.01)
*G01P 15/08* (2006.01)
(Continued)

(52) U.S. Cl.
CPC . *G01L 1/04* (2013.01); *G01P 15/02* (2013.01); *G01P 15/0802* (2013.01);
(Continued)

(58) Field of Classification Search
CPC ............ G01C 19/56; G01L 1/04; G01P 15/02
USPC ...................................................... 73/862.639
See application file for complete search history.

(56) References Cited

U.S. PATENT DOCUMENTS

| 5,723,790 A * | 3/1998 | Andersson .................. 73/514.36 |
| 6,032,531 A * | 3/2000 | Roszhart .................... 73/504.04 |
| 7,637,158 B2 * | 12/2009 | Westby ...................... 73/504.14 |

FOREIGN PATENT DOCUMENTS

| CN | 102128953 A | 7/2011 |
| WO | WO-94/12886 A1 | 6/1994 |
| WO | WO-98/29749 A1 | 7/1998 |

OTHER PUBLICATIONS

Bütefisch, Sebastian et al. "Three-Axes Monolithic Silicon Low-g Accelerometer". Journal of Microelectromechanical Systems, vol. 9. No. 4, Dec. 2000.
Andersson, Gert I. "A Novel 3-Axis Monolithic Silicon Accelerometer". 8th International Conference on Solid State Sensors and Actuators, and Eurosensors IX. Stockholm, Sweden, Jun. 25-29, 1995.
(Continued)

*Primary Examiner* — Lisa Caputo
*Assistant Examiner* — Octavia Hollington
(74) *Attorney, Agent, or Firm* — Harness, Dickey & Pierce PLC

(57) ABSTRACT

A device for measuring force components formed from a single crystal material, wherein the device comprises at least one cantilever beam inclined to a wafer plane normal and formed in one piece with a mass body, which mass body provides a mass of inertia. The mass body has a first and a second major surface which are substantially parallel with a wafer plane. A mass body cross section presents a portion which is substantially symmetrical along a centrally (in the thickness direction) located plane parallel with the wafer plane. Disclosed is also a method for its production and an accelerometer comprising at least one such device. The device allow for a more compact 3-axis accelerometer.

13 Claims, 5 Drawing Sheets

(51) Int. Cl.
*G01P 15/125* (2006.01)
*G01P 15/13* (2006.01)
*G01P 15/02* (2013.01)

(52) U.S. Cl.
CPC ............ *G01P 15/125* (2013.01); *G01P 15/131* (2013.01); *G01P 2015/0854* (2013.01); *G01P 2015/0857* (2013.01)

(56) References Cited

OTHER PUBLICATIONS

European Search Report for European Application No. 12185908.6 dated Apr. 10, 2013.

\* cited by examiner

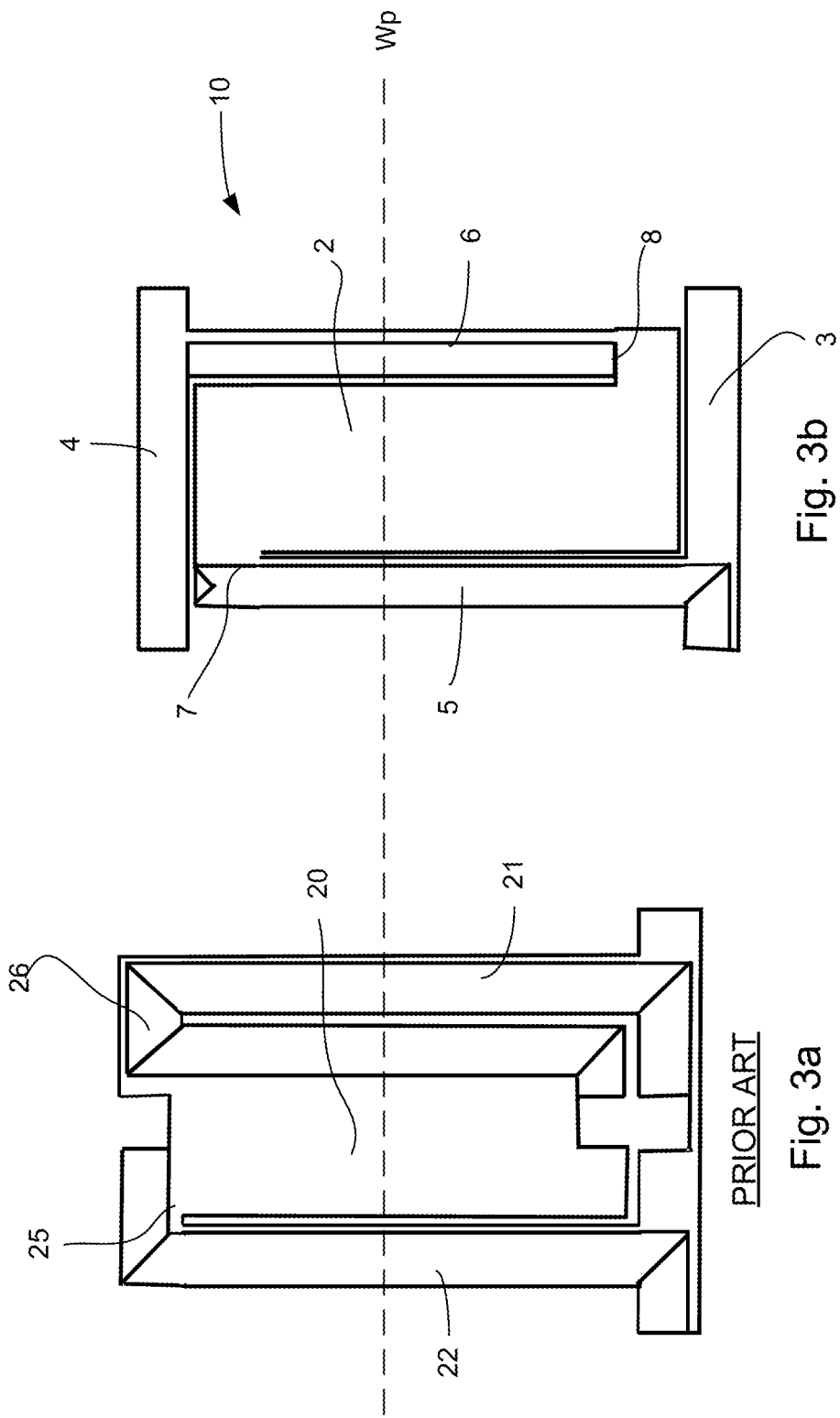

DEVICE FOR MEASURING FORCE COMPONENTS, AND METHOD FOR ITS PRODUCTION

CROSS-REFERENCE TO RELATED APPLICATIONS

The present application hereby claims priority under 35 U.S.C. §119(a) to European patent application number 12185908.6 filed Sep. 25, 2012, and claims priority under 35 U.S.C. §119(e) to U.S. provisional patent application No. 61/705,238, filed Sep. 25, 2012, the entire contents of each of which are hereby incorporated herein by reference.

TECHNICAL FIELD

The present disclosure relates to a device for measuring force components, an accelerometer comprising at least one such device and a method for manufacturing such a device.

BACKGROUND

Accelerometers measure acceleration and may, for example, be used in car safety applications, for machinery health monitoring, in medical applications, in navigation systems, in consumer electronics and in geophysical applications.

A single-axis, or "one dimensional", accelerometer may comprise an acceleration sensor having a mass suspended by a beam or multiple beams on a support structure. To enable simultaneous acceleration measurements in more than one dimension, multiple one dimensional accelerometers may be used, or a three-axial accelerometer may be used.

A force or acceleration applied on the accelerometer results in displacement of a mass from a reference point and/or stress in one or more beams suspending the mass. The displacement or stress is converted into an electrical out-put signal which is proportional to the acceleration. Several different principles may be used for the read-out of accelerometer signals, such as piezoelectric, piezoresistive and/or capacitive detection. The choice of method depends on the intended use of the accelerometer and affects the design as well as the performance of the accelerometer. These read-out principles, as well as the related processing required for deriving an acceleration vector and/or value are known to the skilled person.

Capacitive detection and piezoresistive detection are the dominant read-out principles in commercially available accelerometers. A piezoresistor changes its resistance depending on mechanical stress. Piezoresistivity may be implanted in a monocrystalline silicon wafer or deposited on a wafer as polycrystalline silicon. A voltage output is achieved.

In basic capacitive detection, the displacement of the seismic mass is measured by measuring the capacitance between a fixed plate and the mass body, or a part of the mass body. As the separation of, and/or overlap of, two surfaces (one on the mass and one on a reference structure) changes, the capacitance is also changed. Capacitive read-out electrodes, placed above and/or below the seismic mass, may be utilized for electrostatic actuation. In a capacitive closed-loop feedback system, electrostatic forces are applied to the mass by the electrodes to counter acceleration forces and thereby keep the mass body in its neutral position independent of the applied acceleration. The applied force is a measure of the acceleration.

Many commercially available 3-axis accelerometers are built up of three separate single-axis accelerometers mounted with their sensing axis along the x, y and z axes. This type of accelerometer often, however, suffers from cross-talk between the three axes.

Other 3-axis accelerometer topologies utilize three, or more, identical single-axis sensing elements integrated into the same chip, having their respective sensitive axes inclined with respect to the chip surface. A major advantage with this 3-axis accelerometer topology compared to the one above is that they can be designed such that the transverse sensitivity does not suffer from crosstalk between the different axes, since all single-axis elements are mechanically isolated from each other.

In WO94/12886, a device for measuring force components is disclosed, and the entire disclosure of this document is hereby incorporated by reference into this specification. The "slanted beam" device of WO94/12886 is formed in one piece and consists of up to four identical sensing elements, each having a seismic mass or mass body, where each mass is suspended on at least one thin slanted beam. The slanted beams are inclined to the wafer plane normal, i.e. inclined $57.74°$ along the $\{111\}$-plane of the crystal material, a $\{100\}$ silicon wafer, the device is formed in. The device is produced by anisotropic wet etching, which works from two opposite crystal planes of the single crystal material. Due to the anisotropic wet etching process, a mass body is produced with slanted side-walls, where the center of mass of the mass body automatically appears at the extension of the beam's natural plane, which reduces cross-axis sensitivity. The mass body is asymmetrical around a wafer plane normal and first and second major surfaces of the mass body are displaced in relation to each other. Such a "slanted beam" device is shown in FIG. 2a of this specification. The mass body is also asymmetric about a plane parallel with the wafer plane.

A double beam embodiment of the device design presented in WO94/12886has been evaluated by G.I. Andersson as a 3-axis accelerometer with piezoresistive detecting read-out principle (G.I. Andersson, "A novel 3-axis monolithic silicon accelerometer", The $8^{th}$ Int. Conf. On Solid-State Sensors and Actuators, Transducers '95/Eurosensors IX, Vol. 2, Stockholm, Sweden, pp. 156-160.) and is shown in FIG. 3a of this specification. The double beam embodiment has an M-shape, wherein the inclined beams 21, 22 are attached to the seismic mass 20, i.e. has connecting points 25, 26, at the same side of the seismic mass.

FIG. 2a shows a cross-sectional view along the wafer normal plane Wpn of the prior art "slanted beam" design of a device for measuring force components of WO94/12886. The shape and inclination of the mass body 20 creates dead space between the mass body 20 and the beams 21, 22, which cannot be used as electrode area 23, 24. When utilizing capacitive detection as read-out principle, electrodes 23, 24 are asymmetrically placed around the centre of gravity of the mass body 20. Due to the asymmetric shape of the mass body 20 a torque may be generated when electrostatic forces are applied to the mass body 20 to counter acceleration forces.

S. Bütefisch et al. ("Three-Axes Monolithic Silicon Low-g Accelero-meter", J. Microeletromech. Syst., v. 9, No. 4, Dec 2000) disclose a 3-axis accelerometer design similar to the device in WO94/12886 and manufactured in a similar way. The accelerometer is used with capacitive detection read-out principle.

It would be desirable to provide a more compact 3-axis accelerometer, which makes better use of the space available on the wafer it is produced from, and which has equal or better accuracy than existing devices.

SUMMARY OF THE INVENTION

It is a general object of the present disclosure to provide a more compact device for measuring force components. It is a specific object to provide a device for measuring force components in which a large proportion of the device surface area may be utilized as electrode area.

The invention is defined by the appended independent claims. Embodiments are set forth in the dependent claims, in the attached drawings and in the following description.

According to a first aspect, there is provided a device for measuring force components formed from a single crystal material wafer, wherein the device comprises at least one cantilever beam inclined to a wafer plane normal and formed in one piece with a mass body, which mass body provides a mass of inertia. The mass body has a first and a second major surface which are substantially parallel with a wafer plane. A mass body cross section presents a portion which is substantially symmetrical along a centrally (in the thickness direction) located plane parallel with the wafer plane.

Due to the symmetry of the portion of the mass body cross section along the centrally located plane parallel with the wafer plane, there is little dead space between the mass body and the inclined cantilever beams. A large proportion of the device surface area may thereby be utilized as electrode area. A large electrode area requires less applied voltage to the electrode than a smaller electrode area. With this design, having little dead space, it would also be possible to make a small and compact device.

By the first and second major surfaces being substantially parallel with a wafer plane is here meant that the angular deviation between the wafer plane and the first and second major surfaces, respectively, is less than 10°, less than 5°, less than 1° or less than 0.5°.

By a mass body cross section portion is here meant a portion which constitutes at least 90%, at least 95% or at least 99% of the mass body cross section along the centrally located plane parallel with the wafer plane.

In one embodiment the first and second major surfaces may be substantially aligned along the wafer plane normal.

By the first and second major surfaces being substantially aligned along the wafer plane normal is here meant that the first and second major surfaces may be aligned so as to overlap each other to at least 90%, to at least 95% or to at least 99% of the area of one of the surfaces.

In one embodiment of the device, the mass body may be substantially symmetrical along a plane perpendicular to the wafer plane.

With such a symmetrical mass body, electrodes may be placed symmetrically above and below the mass body, which is an advantage when the device is used in a capacitive closed-loop feedback system. An asymmetric mass body and asymmetrically placed electrodes would, when electrostatic forces are applied to the asymmetric mass body to counter acceleration forces, generate torques, which act on the mass body. Torque forces should be avoided in order not to excite unwanted mechanical resonance modes. To reach high performance of the device may be desirable to suppress higher order modes efficiently. Signal levels and noise are highly dependent on how efficiently these modes can be handled. The symmetric mass body and the symmetrically placed electrodes may alleviate or solve this problem.

The first and second major surfaces may have substantially the same area.

By substantially the same area is here meant that the area of the first major surface is at least 90%, at least 95%, or at least 99% of the area of the second major surface, or vice versa.

In one embodiment of the device a cross-sectional area of the mass body along the wafer plane normal, starting from one of the major surfaces, tapers towards a cross-section minimum and then increases towards the other major surface.

This shape of the mass body, compared to prior art mass bodies with slanted sidewalls, does not consume space that cannot be used as electrode area. Thereby, the mass body may be better utilized from an electrode placement point of view.

The tapering and the increase may, respectively, substantially coincide with respective crystal planes of the wafer.

In one embodiment, the device presents at least two connecting points for connection between at least two respective cantilever beams and the mass body, the connecting points being placed at substantially diametrically opposite portions of the mass body.

The use of this so called S-shaped device, the S-shape referring to the placement of the connecting points on the mass body for connection to the cantilever beams, in an accelerometer with capacitive closed-loop feedback system allow for higher separation in frequency for second and third modes than when using traditional M-shaped devices, in which the cantilever beams are attached to the mass body at the same side of the mass body.

Each cantilever beam may have its principal length extension along an edge portion of the mass body.

The cantilever beams may extend in different directions from the respective connecting point.

The different directions may be substantially opposite.

The single crystal material may in one embodiment be chosen from a group consisting of silicon, silicon carbide, gallium arsenide, germanium, gallium nitride/silicon carbide, aluminum nitride, gallium nitride, aluminum/gallium nitride, or indium/gallium nitride.

According to a second aspect there is provided an accelerometer comprising at least one device as described above.

The accelerometer may be suitable for car safety applications, for machinery health monitoring, in medical applications, in navigation systems, in consumer electronics and in geophysical applications.

In other embodiments, an accelerometer could comprise two, three or four of the devices as described above.

These devices are then all formed on the same chip, e.g. with device wafers formed in one piece from the same material.

The accelerometer may be provided with at least one electrode on a device wafer surface.

The at least one electrode may be split into several smaller electrodes. In one embodiment, the accelerometer may utilize capacitive detection as read-out principle.

Often electrodes are provided both above and below the mass body.

According to a third aspect there is provided a method for manufacturing a device for measuring force components in a single crystal material, the method comprising the steps of:
 dry etching a wafer of the single crystal material to provide a pattern extending substantially perpendicular to the wafer surface plane; and
 subsequently anisotropically wet etching the wafer along at least one wafer crystal plane to provide a structure in the wafer, which is undercut, as seen from both major surfaces.

By combining dry etching with a subsequent wet etching step it is possible to produce slanted cantilever beams and non-slanted mass bodies in the same crystal material wafer. By non-slanted mass body is here intended a mass body that differs from the shape of the mass body shown in prior art WO94/12886. The mass body derived by this method is a symmetrical mass body having a cross-sectional area along a wafer plane normal, starting from one of its major surfaces, tapers towards a cross-section minimum and then increases towards its other major surface.

Further, with this combination of dry etching and wet etching large open areas on the etch masks are not required to etch through the full wafer thickness. This causes less etch losses and increases the total chip area of the device compared to if only wet etching is used for the manufacturing of the device.

With this method little dead space is created between the inclined cantilever beams and the mass body. Therefore, it would be possible to make a smaller and more compact device using this method than when using wet etching alone. Also, a large proportion of the device surface area may be utilized as electrode area.

This method may be used for manufacturing a device for measuring force components or an accelerometer as described above.

In one embodiment, the method further comprises steps of:
- selectively covering the wafer surfaces in a wafer plane with a respective wet etch mask; and
- selectively covering the wafer surfaces and/or the patterned protective films with a respective dry etch mask.

In yet an embodiment, the method further comprises a preceding step of creating a gap recess in the wafer surfaces along the wafer plane.

BRIEF DESCRIPTION OF THE DRAWINGS

The above, as well as other aspects, objects and advantages of the present disclosure, will be better understood through the following illustrative and non-limiting detailed description, with reference to the appended drawings.

FIG. 3a shows a top view of a prior art "slanted beam" design of a device wafer for measuring force components.

FIG. 3b shows a top view of an embodiment of a device wafer for measuring force components.

FIG. 4a shows a top-view sketch of a multi-electrode design.

FIG. 4b shows a cross section sketch of a multi-electrode design taken along line A-A" in FIG. 4a.

DETAILED DESCRIPTION

Figure 1:
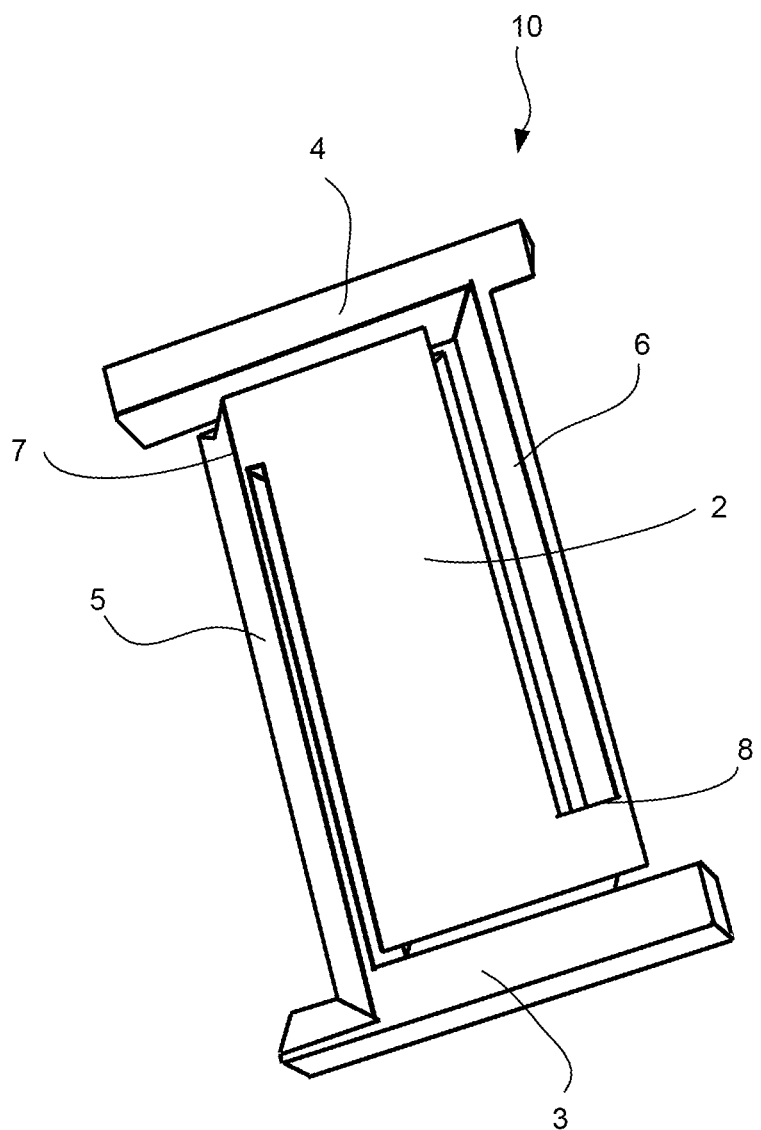
FIG. 1 shows an isometric view of a device wafer for measuring force components.
Figures 2A, 2B:
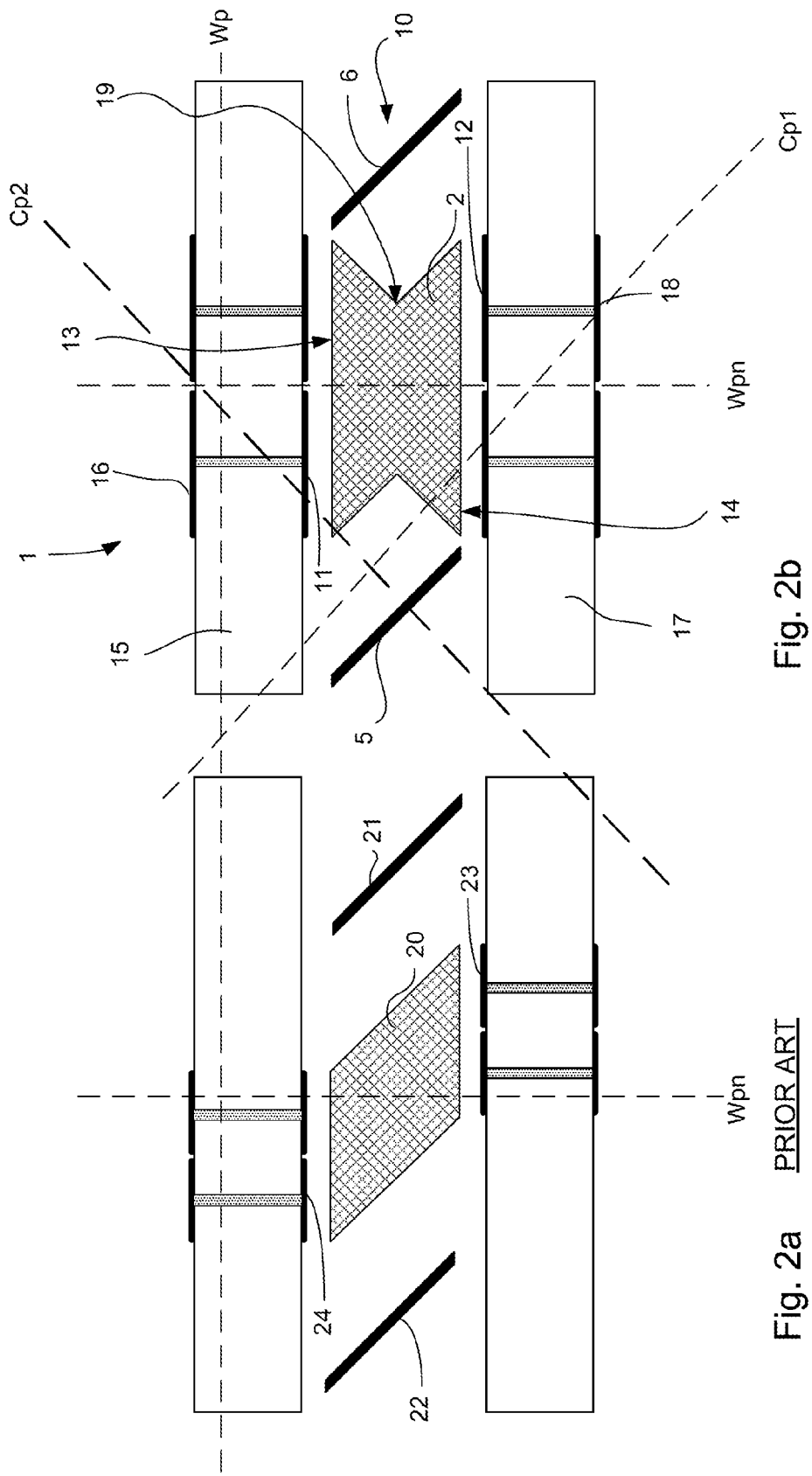
FIG. 2a shows a cross-sectional view, along a wafer normal plane, of a prior art "slanted beam" design of a device for measuring force components.
FIG. 2b shows a cross-sectional view, along a wafer normal plane, of an embodiment of a device for measuring force components.

As shown in FIG. 1 and FIG. 2b, a device 1 for measuring force components comprises a device wafer 10 (in one piece) comprising a mass body 2, two stationary bases 3, 4 and two cantilever beams 5, 6. The device 1 further comprises electrodes 11, 12 applied to first 13 and second 14 major surfaces of the mass body 2. A top cap wafer 15 is coupled to the mass body 2 and includes at least one top capacitor electrode 16. A bottom cap wafer 17 is also coupled to the mass body 2 and includes at least one bottom capacitor electrode 18.

The cap wafers 15, 17 have connections for the electrodes 11, 12, 16, 18, which may extend through the cap wafer 15, 17. Such cap wafers 15, 17 could for example be of a composite type comprising glass for isolation and silicon feedthroughs for the electrodes 11, 12, 16, 18. Another cap wafer 15, 17 may comprise silicon with silicon dioxide as isolation.

As may be seen in FIG. 2b, the first 13 and a second 14 major surfaces of the mass body 2 are substantially parallel with a wafer plane Wp and substantially aligned along the wafer plane normal Wpn. The mass body 2 cross section (c.f. FIG. 2b) may present a portion which is substantially symmetrical along a centrally (in the thickness direction) located plane parallel with the wafer plane Wp. In particular, such cross section may be substantially perpendicular to the main direction of at least one, possibly both, beams 5, 6 suspending the mass body 2. The mass body 2 may further be substantially symmetrical along a plane perpendicular to the wafer plane Wp and the first and second surfaces 13, 14 may have substantially the same area. A cross-sectional area of the mass body 2 along the wafer plane normal Wpn, starting from one of the major surfaces 13, 14, may taper towards a cross-section minimum 19 and then increase towards the other major surface 13, 14. The tapering and the increase may coincide with respective crystal planes of the wafer Cp1, Cp2.

Each mass 2 may be suspended on two or more thin inclined cantilever beams 5, 6, FIG. 1. In the embodiment with two cantilever beams, there are two (i.e. one for each beam) connecting points 7, 8 for connection between the respective cantilever beam 5, 6 and the mass body 2. The connecting points 7, 8 may be placed at substantially diametrically opposite portions of the mass body 2. The cantilever beams 5, 6 may have their respective principal length extension along (e.g. substantially parallel with) a respective edge portion of the mass body 2 and may extend in different directions from the respective connecting points 7, 8. These directions may be substantially opposite. The cantilever beams 5, 6 are connected to the respective base 3, 4 with their other end. The device is also shown in top-view in FIG. 3b. The shape of the device 1 may be seen as an S.

A device such as the one shown in FIG. 1 may be used in an accelerometer for measuring acceleration in one dimension. For measuring acceleration along three axes (x, y and z), multiple, such as two, three or four such devices may be integrated on the same wafer of an accelerometer.

In a capacitive closed-loop feedback system, an electrostatic feedback force is applied to the mass body by the electrodes placed above and below the mass body in order to counter acceleration forces and thereby keep the mass body in its neutral position independent of the applied acceleration. The force exerted by the control system is a measure of the acceleration. The frequency used is high to give low quantization noise. FEM model analysis has shown that higher separation in frequency may be achieved for second and third modes for the S-shaped device shown in FIG. 1 and FIG. 3b than for the M-shaped prior art device shown in FIG. 3a. M- and S-shaped sensors are, however, equivalent regarding placement in frequency of the first mode and the basic function.

Figures 4A, 4B:
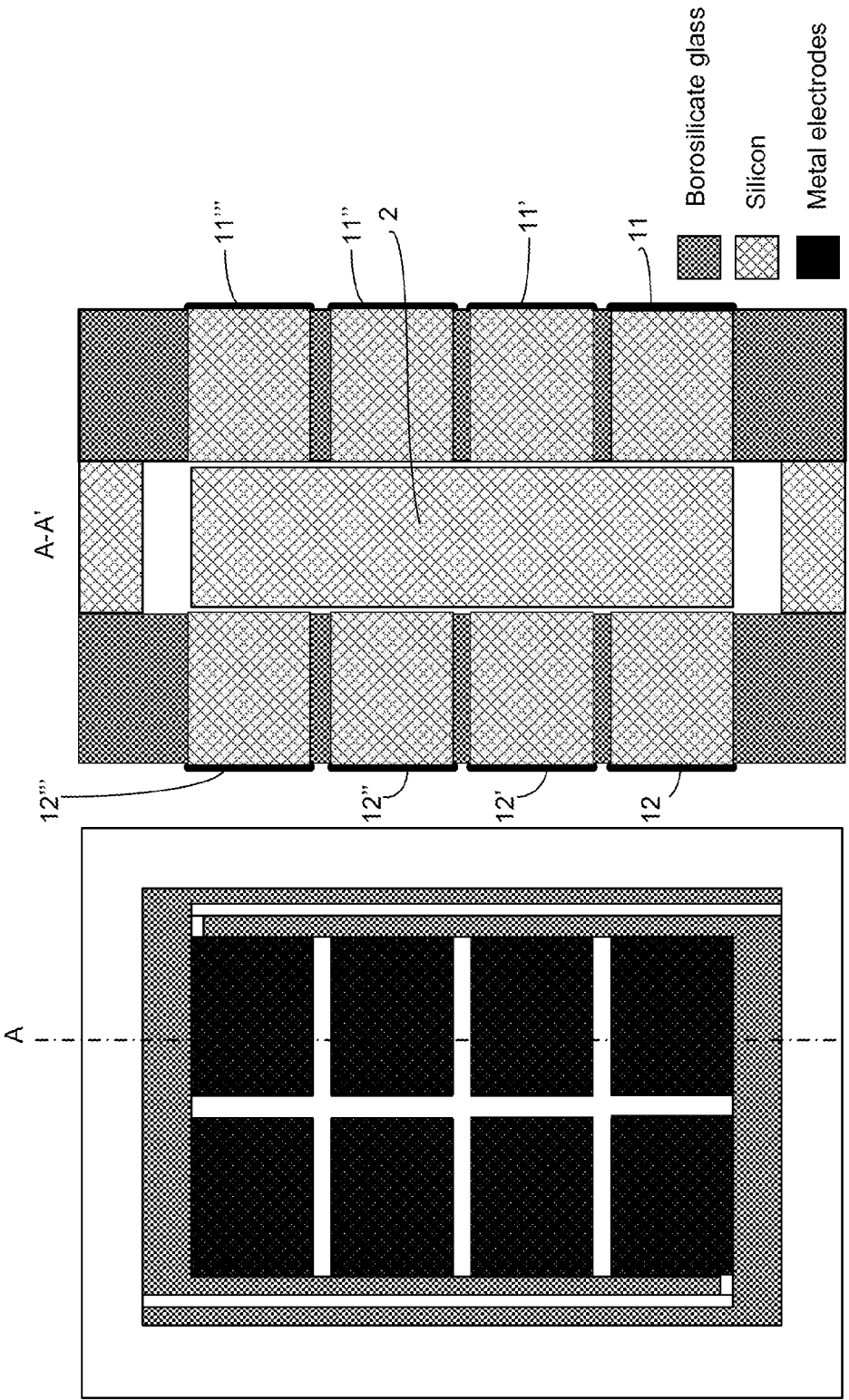

In FIG. 4a a top-view sketch of a multi-electrode design is shown and in FIG. 4b a cross section sketch of the multi-electrode design taken along line A-A" in FIG. 4a is shown. Each mass body 2 may have one electrode 11 above and/or one electrode 12 below to enable measurements of the mass 2 position and the application of electrostatic feedback forces. To reduce the power supplied in capacitive read-out, the ASIC (Application Specific integrated Circuit) may be designed to apply either zero voltage or the supply voltage during the feedback phase. The frequency should be high to give low enough quantization noise. Charging and discharging the capacitances at this high frequency consumes power. Instead, the electrodes 11, 12 may be divided into several smaller electrodes where each electrode has either zero voltage or the supply voltage. In FIG. 4a and FIG. 4b each electrode 11, 12 has been divided into four smaller electrodes 11, 11', 11", 11''', 12, 12', 12", 12'''. This yields a low quantization noise using lower frequency. Thus the multiple electrodes 11, 11', 11", 11''', 12, 12', 12", 12''' allow a higher resolution of the electrostatic control force with minimum power consumption. The mass body 2 itself is still one electrical node, however. Hence, each major surface of the mass 2 may be provided with two or more electrodes. Each such electrode may be individually readable.

Single electrodes 11, 12 can only control the up-down movement of the mass body. Higher modes cannot be suppressed with single electrodes 11, 12. By using multi-electrodes 11, 11', 11", 11''', 12, 12', 12", 12''' with independent feedback voltage, it is possible to both measure the higher modes and apply forces that suppress them. The multiple electrode design may require cap wafers 15, 17 with through wafer via connections for each electrode 11, 11', 11", 11''', 12, 12', 12", 12'''.

In one embodiment, an accelerometer may comprise four of the multi-electrode devices shown in FIG. 4a, 4b. In other embodiments an accelerometer may comprise two or three such multi-electrode devices. In yet further embodiments, five or even six such devices may be used in an accelerometer.

A seen from the cross-sectional view along the wafer normal plane Wpn for the device design of the present specification, FIG. 2b, there is little "dead space" between the mass body 2 and the cantilever beam 5, 6. Thereby, there is a large electrode 11, 12 surface area available in the device embodiment in FIG. 2b. The whole wafer area may be therefore be decreased and a large proportion of the device 1 surface may be utilized as electrode 5, 6 area. Electrodes 5, 6 may be placed above and below the mass 2 symmetrically around the center of gravity of the mass body 2. With this shape of the mass body 2, the mass body 2 does not consume space that cannot be used as electrode 5, 6 area and hence the inert mass 2 is utilized better than in the device shown in FIG. 2a.

In FIG. 5a-5e, steps in a method for manufacturing an embodiment of the device 1 are shown.

Figure 5A:
FIG. 5a-5e schematically shows the steps for manufacturing a device wafer for measuring force components.

First a wafer 60 is supplied, FIG. 5a. The wafer material may be any monocrystalline material such as (but not limited to) silicon, silicon carbide, gallium arsenide, germanium, gallium nitride/silicon carbide, aluminum nitride, gallium nitride, aluminum/gallium nitride, or indium/gallium nitride. In the described embodiment, a (100)-oriented silicon wafer is used.

Figure 5B:
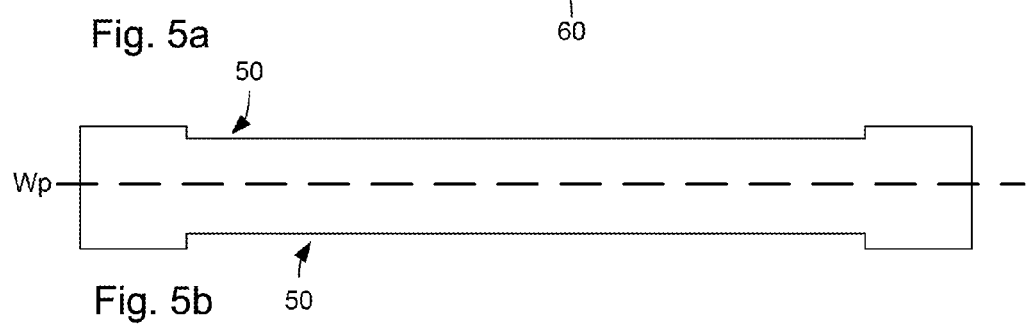

In a next step, FIG. 5b, a gap recess 50 (which may be optional) may be created in the wafer 60 surface along the wafer plane Wp. This gap recess 50 creates space for movement of the mass body 2 so that the mass body 2 will not be clamped between cap wafers 15, 17 when the device 1 is used with cap wafers 15, 17 in an accelerometer design. The gap recess 50 also creates channels for air.

Thereafter, the wafer 60 surface is, in a wafer plane Wp, provided on both major surfaces with a first patterned mask, which may be a wet etch mask 51, adapted for anisotropic wet etching. Such a wet etch mask 51 may, for example, if the wafer material is silicon, be produced by thermal oxidation of the (100) silicon substrate, which provides a protective silicon dioxide layer aligned along the (110)-directions. Alternatively, silicon nitride, gold, chromium and various other materials can be used as etch masks, alone or in combination, depending on what etch solution is to be used. The provision of such masks 51, as well as the etching processes as such, are known per se, and need no further description herein.

Figure 5C:
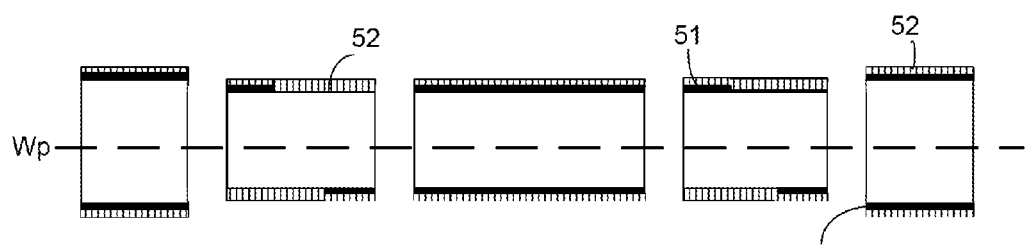

The wafer 60 surface and/or the wet etch mask 51 may then be provided with a second patterned mask, which may be a dry etch mask 52, adapted for anisotropic dry etching, FIG. 5c. The wet etch mask 51 and dry etch mask 52 may form a so-called double mask. The dry etch mask 52 may be a photo resist or any other type of mask suitable for the selected dry etching technique.

The wafer 60 is then dry etched to provide a pattern, the depth of which extends substantially perpendicular to the wafer surface plane Wp, FIG. 5c. Dry etching follows the geometries of the mask 52 and the wafer 60 may be etched at a substantially right angle relative to the wafer plane Wp.

Different dry etching techniques may be used alone or in combination, such as plasma etching, sputtering and reactive ion etch (RIE) or deep reactive ion etch (DRIE). Using DRIE, 90° walls may be fabricated. The dry etching creates symmetrical masses. A preferred dry etching technique is an anisotropic dry etching technique.

Figure 5D:
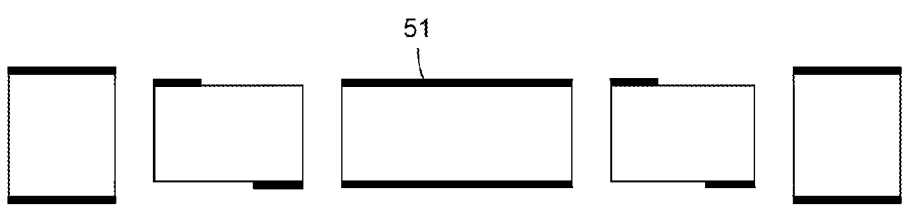

The dry etch mask 52 may subsequently be removed; FIG. 5d, and the back and front etch patterns cleaned from the symmetrical masses.

Figure 5E:
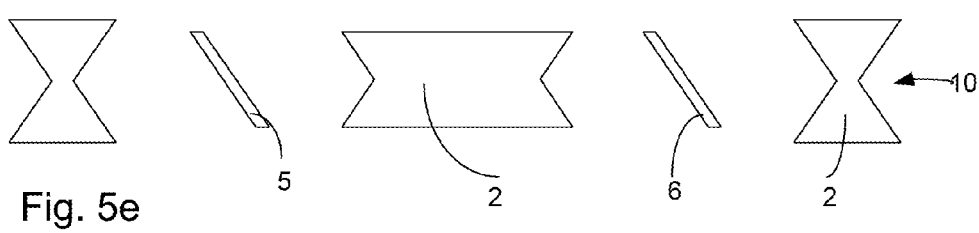

Thereafter, anisotropical wet etching, FIG. 5e, is performed of the masses along at least one wafer crystal plane to promote a structure in the wafer 60, which is undercut, as seen from both major surfaces of the wafer, forming the device wafer 10. The wet etching may be an anisotropic etching, in which etching occurs from two equivalent opposite crystal planes Cp1, Cp2 of said single crystal material. In anisotropic wet etching, the {100}- and {110}-crystal planes are being etched much faster than the stable {111} planes, which act as natural restriction surfaces for the etch.

The wet etch may be applied from both major surfaces of the wafer.

The wet etching used may be the common KOH anisotropic wet etching. Other etch solutions which may be used are KOH, NaOH, LiOH, CsOH, RbOH, EDP (Ethylene-Diamine/Pyrocatechol), TMAH (TetraMethyl Ammonium Hydroxide), etc. Wet etching of various monocrystalline materials is known per se, and need no further description.

The choice of etch solution depends on the material to be etched. Wet etching is dependent on temperature, where an increased temperature gives an increased etch speed and a smoother surface. By etching from both sides of the substrate and using the natural etch stop that the (111)-planes constitute, the cantilever beam 5, 6 thickness is easily determined by the displacement of the front etch mask relative the back etch mask. When the wafer 10 is etched through in principle all free surfaces constitute (111)-planes, the etching process stops automatically.

Wet anisotropic etching has a convex corner undercut effect Undercutting of convex corners may be prevented by different corner compensation structures, as is discussed by S. Bütefisch et al.

By combining dry etching with a subsequent wet etching it is possible to produce slanted cantilever beams 5, 6 and non-slanted mass bodies 2.

Further, with this combination of dry etching and wet etching, large open areas on the etch masks 51 are not required to etch through the full wafer 10 thickness. This causes less etch losses and increases the total chip area of the device 1 compared to if only wet etching is used for the manufacture of the device.

The invention claimed is:

1. A device for measuring force components, said device comprises:
   at least one cantilever beam inclined to a wafer plane normal and formed in one piece with a mass body, providing a mass of inertia,
   wherein said mass body has a first and a second major surface which are substantially parallel with a wafer plane,
   wherein a mass body cross section presents a portion which is substantially symmetrical along a centrally located plane parallel with said wafer plane,
   wherein the at least one cantilever beam and the mass body are formed in the same crystal material wafer, and
   wherein the at least on slanted cantilever beam extends mainly along the wafer plan normal along a thickness of the mass body.

2. The device according to claim 1, wherein said first and second major surfaces are substantially aligned along said wafer plane normal.

3. The device according to claim 1, wherein said mass body is substantially symmetrical along a plane perpendicular to said wafer plane.

4. The device according to claim 1, wherein said first and second major surfaces have substantially the same area.

5. The device according to claim 1, wherein a cross-sectional area of said mass body along said wafer plane normal, starting from one of said major surfaces, tapers towards a cross-section minimum and then increases towards the other major surface.

6. The device according to claim 5, wherein said tapering and said increase, respectively, substantially coincide with respective crystal planes of the wafer.

7. The device according to claim 1, wherein said device presents at least two respective connecting points for connection between at least two cantilever beams and said mass body, said connecting points being placed at substantially diametrically opposite portions of said mass body.

8. The device according to claim 7, wherein each cantilever beam has its principal length extension along an edge portion of said mass body.

9. The device according to claim 7, wherein said cantilever beams extend in different directions from the respective connecting point.

10. The device according to claim 9, wherein said different directions are substantially opposite.

11. The device according to claim 1, wherein said single crystal material may be chosen from a group consisting of silicon, silicon carbide, gallium arsenide, germanium, gallium nitride/silicon carbide, aluminum nitride, gallium nitride, aluminum/gallium nitride, or indium/gallium nitride.

12. An accelerometer comprising at least one device according to claim 1.

13. The accelerometer according to claim 12, wherein at least one electrode is provided on a device wafer surface.

* * * * *